United States Patent [19] [11] 3,813,513

Vora et al. [45] May 28, 1974

[54] THERMAL PRINTING DEVICE

[75] Inventors: Madhukar B. Vora, Beacon; Leon L. Wu, Wappingers Falls, both of N.Y.

[73] Assignee: International Business Machines Corporation, Armonk, N.Y.

[22] Filed: Mar. 16, 1973

[21] Appl. No.: 341,830

[52] U.S. Cl. ................ 219/216, 219/543, 346/76 R
[51] Int. Cl. ........................................ H05b 1/00
[58] Field of Search ........... 219/216, 543; 346/76 R

[56] References Cited

UNITED STATES PATENTS

| | | | |
|---|---|---|---|
| 3,501,615 | 3/1970 | Merryman et al. | 219/216 X |
| 3,515,850 | 6/1970 | Cady | 219/543 X |
| 3,700,852 | 10/1972 | Ruggiero | 219/216 |

*Primary Examiner*—George Harris
*Attorney, Agent, or Firm*—Henry Powers

[57] ABSTRACT

A thermal printing device having an array of semiconductor heating elements forming character matrixes on selective heating of the elements for transfer of informational display to heat sensitive papers. The thermal printing displays are fabricated by standard integrated techniques into a structure in which the heating of the elements, in the array, is constrained to portions thereof which are to be disposed adjacent the heat sensitive medium on which the character is formed. Since the heating elements are formed by conventional integrated circuit techniques, they can be formed in a single wafer into which can also be concurrently integrated the necessary drive and character generating circuits.

16 Claims, 20 Drawing Figures

THERMAL PRINTING DEVICE

FIELD OF THE INVENTION

This invention relates to thermal printing devices, and more particularly, to novel semiconductor thermal displays fabricated in a structural configuration adapted for concurrent integration therewith of drive and character generating circuits.

BACKGROUND OF THE INVENTION

Various prior art thermal printing assemblies have heretofore been developed for the reproduction on heat sensitive paper of information patterns, including alphanumeric, pictorial and other data, from digital data such as obtained from digital computers and the like. Generally, the thermal printer can be comprised of one or more character matrixes, each of which will contain an array of heating elements which can be selectively energized in a corresponding heat pattern whose informational representation can be transferred by contact to heat sensitive paper. In general applications, single character matrix head can be employed in typewriter fields and a linear array of a series of character matrixes can be employed in printer fields.

Although various processes have been employed in the fabrication of thermal printing displays, one process which has received extensive consideration is that utilizing semiconductor integrated circuit technology in view of the ability of this technique to achieve significant microminiaturization of the final structures. While such approach offers significant advantages in processing, it is nevertheless also characterized with a number of disadvantages. For example, fabrication of thermal printing units, heretofore, has involved the subdivision of a semiconductor substrate into an array of heater elements, of a character matrix, with the entire mass of each element heated by appropriate integrated circuitry formed therein. Such heating of the entire mass of these elements is characterized by high power requirements. Also, although such an approach has permitted the fabrication of drive circuits integrally with the heating element circuitry in a semiconductor substrate or wafer, to reduce the need for utilization of external electrical interconnections between them, the process is nevertheless not amenable to concurrently incorporating in the wafer, by integrated circuit techniques, character generating logic, for selectively energizing necessary ones of heating elements in the desired information pattern. For this reason, the fabrication of character generating circuitry has required use of a plurality of discrete semiconductor substrates which still necessitates a large number of external electrical connections between the character generator module and the printing module in which the drive and heating circuitry have been integrated.

SUMMARY OF THE INVENTION

In contrast to the prior art, the present invention comprehends a thermal display or printing module utilizing a novel heating element construction which permits their fabrication, concurrently, with the necessary drive and character generating circuitry in the same semiconductor substrate by conventional integrated circuit techniques using photolithographic etching, metallization, and diffusion operations which are standard in the art. Such an objective is obtained by fabrication of the active and passive components of the thermal display from a semiconductor substrate comprised of coplanar layers of opposite conductivity type which are disposed in contiguous relationship to form a PN junction between them. Typically, such a substrate can be formed from a base layer of one conductivity type on which is grown an epitaxial layer of opposite conductivity type in which are formed the required number of active and passive components of the thermal display. In accordance with the more detailed description below, such a dual layered substrate enables the fabrication of semiconductor heating elements in which the active components of heating circuitry can be formed in one of the layers in a pattern which employs the other layer as a heating resistor in a manner substantially constraining current flow and corresponding heating within the mass. As described below, the heating circuitry comprises a transistor formed in a discrete portion of the epitaxial layer which is electrically isolated within the layer by an annular circumscribing diffused barrier zone extending from the exposed surface thereof into the other of the layers. Such a bilayered construction of the heating elements enables concurrent use of the diffused isolation regions with supporting circuitry of the thermal display in a manner which allows the integration of driving and character generating circuitry concurrently with the heating circuitry in a common semiconductor substrate. Such integration results in a further significant reduction in external electrical interconnections required for operating the thermal display.

Accordingly, it is an object of this invention to provide a novel and improved heating element for thermal printing and display assemblies.

Another object of this invention is to provide novel and improved thermal printing arrays for reproduction of alphanumeric, pictorial and other informational patterns from digital data.

A further object of this invention is to provide a novel thermal printing and display unit formed as an integrated circuit incorporating heating, driving and character generating circuits within a common semiconductor substrate.

The foregoing and other objects, features and advantages of the invention will be apparent from the following more particular description of the invention, in conjunction with the accompanying drawings.

DESCRIPTION OF THE PREFERRED EMBODIMENTS

Figure 1:
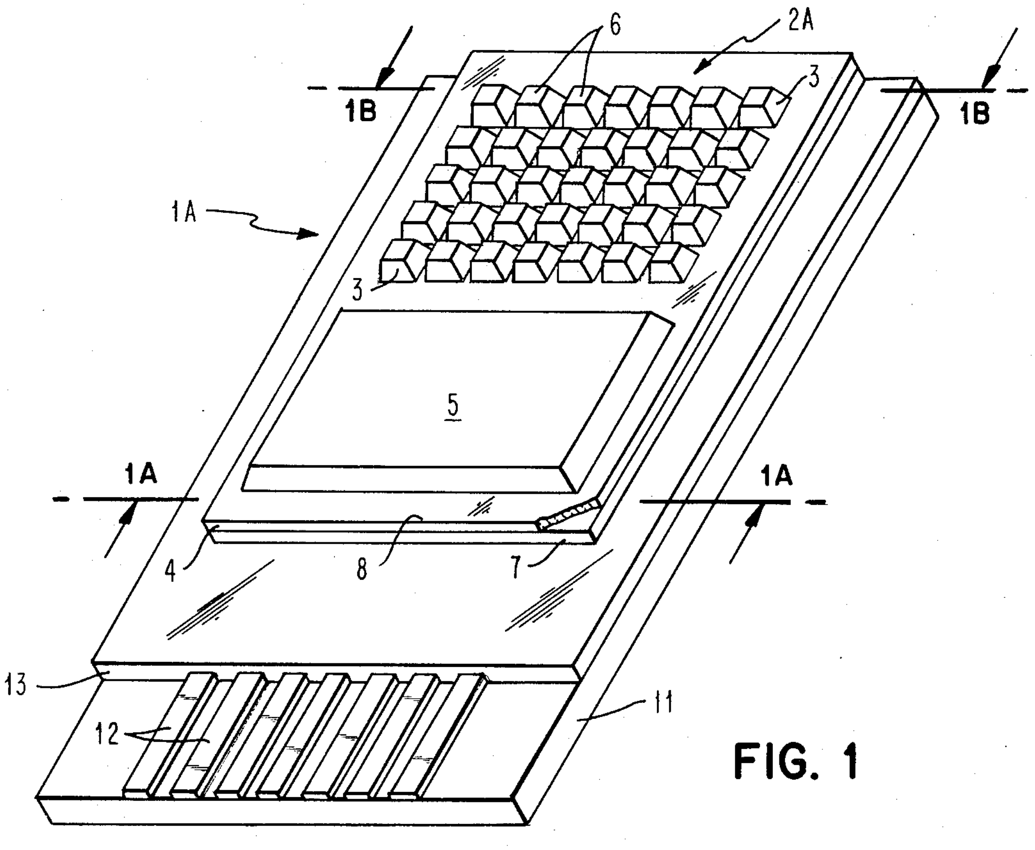
FIGS. 1 and 2 are top perspective drawings of two respective embodiments of this invention.
Figure 1A:
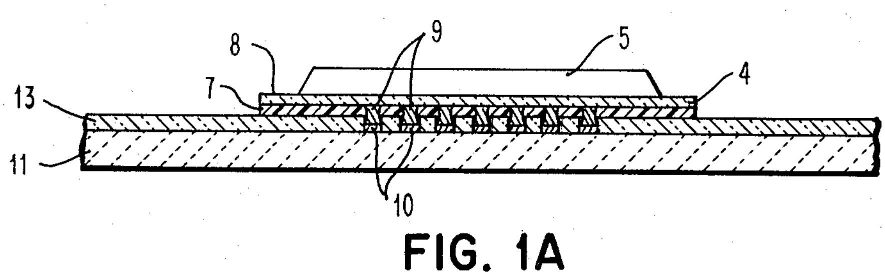
FIGS. 1A and 1B are two sectional views taken along respective lines 1A—1A and 1B—1B of FIG. 1.
Figure 1B:
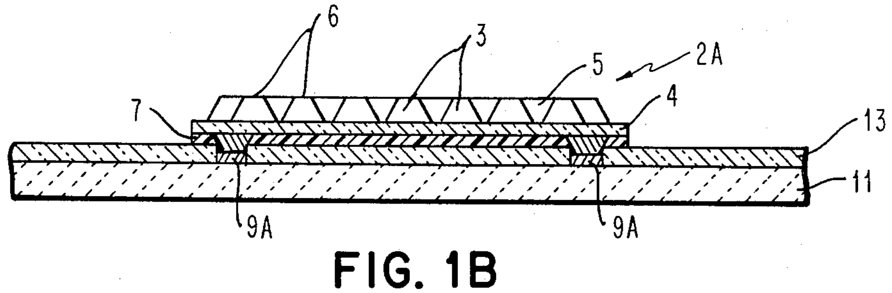
Figure 2:
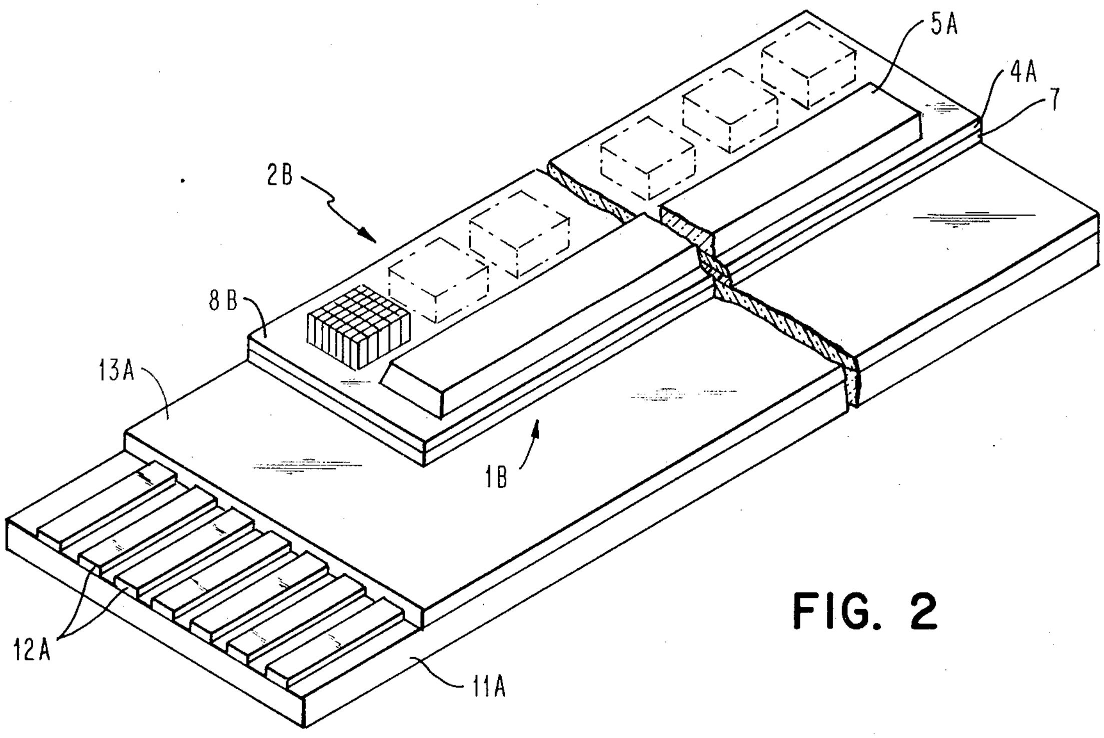
Figure 3:
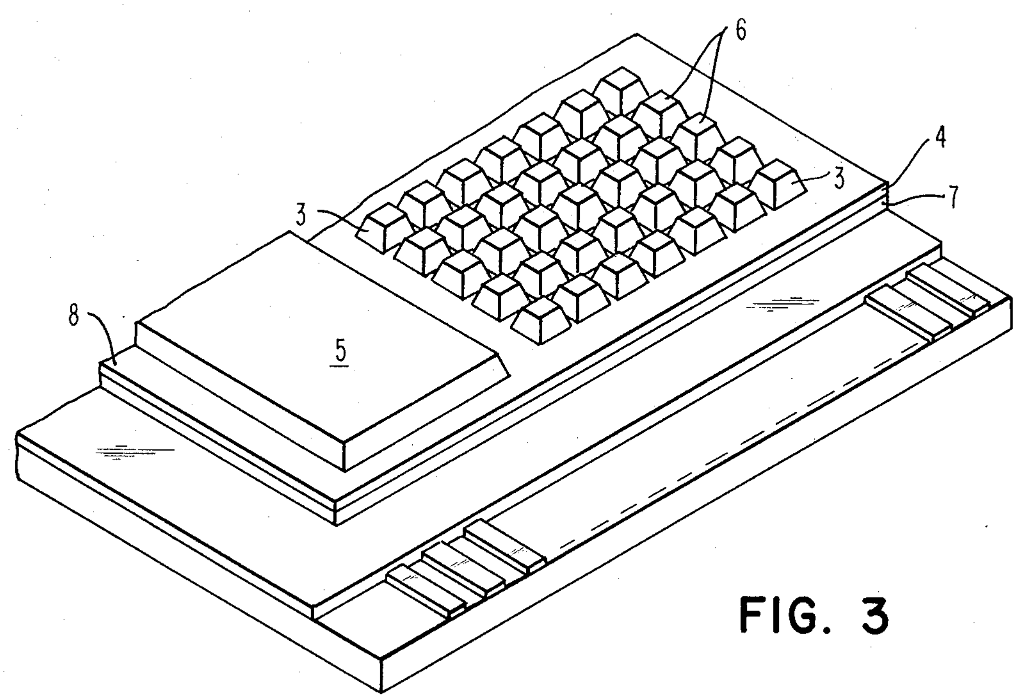
FIG. 3 is a pictorial representation of a thermal display assembly formed by integrated circuit techniques and subdivided into an array of semiconductor heating elements in one part of the unit and supporting circuitry in another part of the unit comprising an integrated structure incorporating character generating and driving circuits.

Referring to FIGS. 1 and 2, two embodiments of the invention are shown therein in which a thermal display assembly or module is mounted by means of electrical connection of terminals on the bottom surface thereof to a conductor pattern coated on a larger insulating support of any suitable material such as ceramic, glass, sapphire, or the like. Where the thermal display unit will be disposed in spaced relationship to the insulating support, the space between them is preferably reinforced by suitable filler material 7 having electrically insulating properties, such as epoxy.

The embodiment of FIG. 1 incorporates a thermal display assembly 1A having a single character matrix 2A illustratively comprised of a 5 × 7 array of semiconductor heater elements 3 bonded to a dielectric substrate 4 which normally will comprise a film or layer of silicon dioxide formed as a coating on elements 3 during their fabrication. Bonded to another portion of the same surface of substrate 4 is a semiconductor mass or segment 5 containing therein supporting circuitry, comprised of character generating and drive circuits which are formed by integrated circuit techniques in a prior stage of fabrication. Each of the heater elements 3 are thermally and electrically isolated from each other on substrate 4; and each element 3 will contain heating circuitry (in the portion thereof adjacent substrate 4) in a construction which will constrain lateral generation of heat within the upper portions adjacent the top faying surfaces 6 of the elements 3. Electrical interconnection for selectively triggering or actuating the heating circuits within heating elements 3, by the supporting circuitry in the semiconductor unit 5, is obtained by a suitable conductor pattern extending between the heating circuit components and the supporting circuit components, within and on the supporting surface 8 of the dielectric substrate 4. The terminal portions of the conductor patterns are connected through the dielectric substrate 4 to terminals or pads 9 on the underside thereof for bonding in electric connection to corresponding terminal portions of a conductor pattern 10 coated on the dielectric support 11, with the conductor pattern 10 extending to respective terminals 12 at an edge of support 11; and which, if desired, can be protected from ambient atmospheres by an overcoating 13 of a suitable film of dielectric material such as sputtered glass, quartz, and the like. The resultant structure is preferably reinforced by the addition of electrically insulating filler material 7, such as epoxy, into the space or gap formed between the bottom of substrate 4 and the adjacent surface of support 11.

The embodiment of FIG. 2 differs from the preceding embodiment of FIG. 1 by the incorporation of a plurality of character matrixes 2B with the supporting circuitry in the semiconductor segment 5A modified to concurrently and selectively activate, in a programmed pattern, the heating circuits in the heating element array of each of the character matrixes 2B. As is to be understood, the heating element array of each character matrix will be similar to that of the preceding embodiment, and are depicted for convenience in FIG. 2, as cross-hatched lines within each character matrix 2B.

Figure 4:
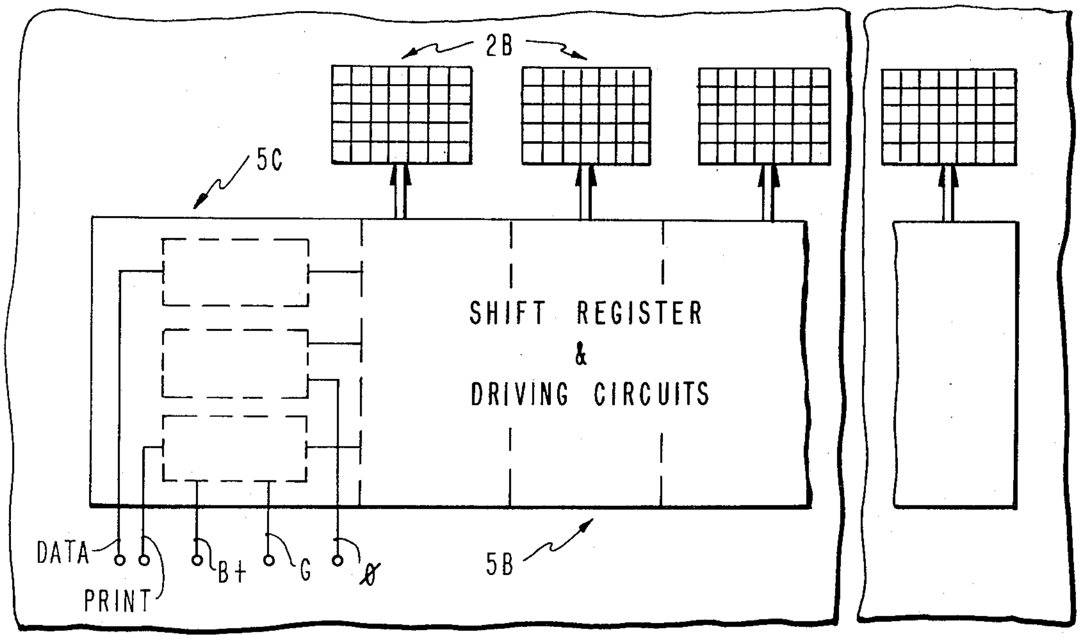
FIG. 4 illustrates the relationship of a plurality of thermal printing character matrixes to driving circuitry and character generating circuitry.

Among various character generating circuits comprehended within this invention, one preferred form is a circuit adapted to receive serial data e.g. from a computer and the like, store such data in the cells thereof, and convert it to parallel data at a corresponding number of parallel outputs connected through a like number of driving circuits to corresponding ones of the heating circuits of the respective heating elements 3. One particularly convenient form of such a character generator is a shift register generally shown as integrated with associated driving circuits in semiconductor segment 5B, see FIG. 4, in which may also be included a portion 5C having integrated therein appropriate peripheral circuits such as complementary generators 21 and 22, respectively, illustrated more specifically in FIG. 6B, for generation of complementary data inputs $I_1$ and $I_2$ (e.g. $\bar{I}_1$) to the shift register and in FIG. 6C for generation of complementary clock signals $\phi_1$ and $\phi_2$ (e.g. $\bar{\phi}_1$) for control of the shift register. In addition, the semiconductor portion 5C of segment 5B may also have integrated therein a write control (WC) circuit 23 such as shown in FIG. 6D.

Figure 5B:
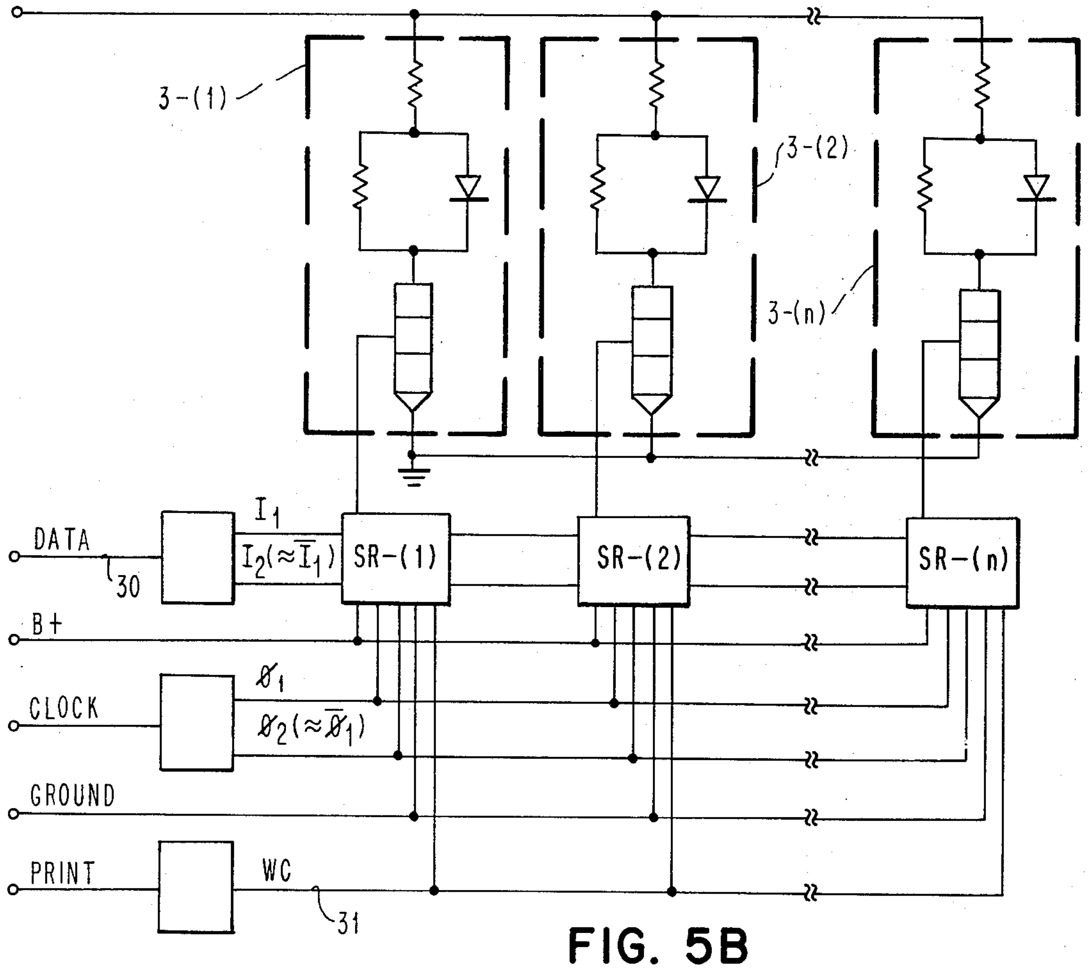
FIG. 5B illustrates a portion of the embodiment of FIG. 5A unfolded in linear form.
Figure 5A:
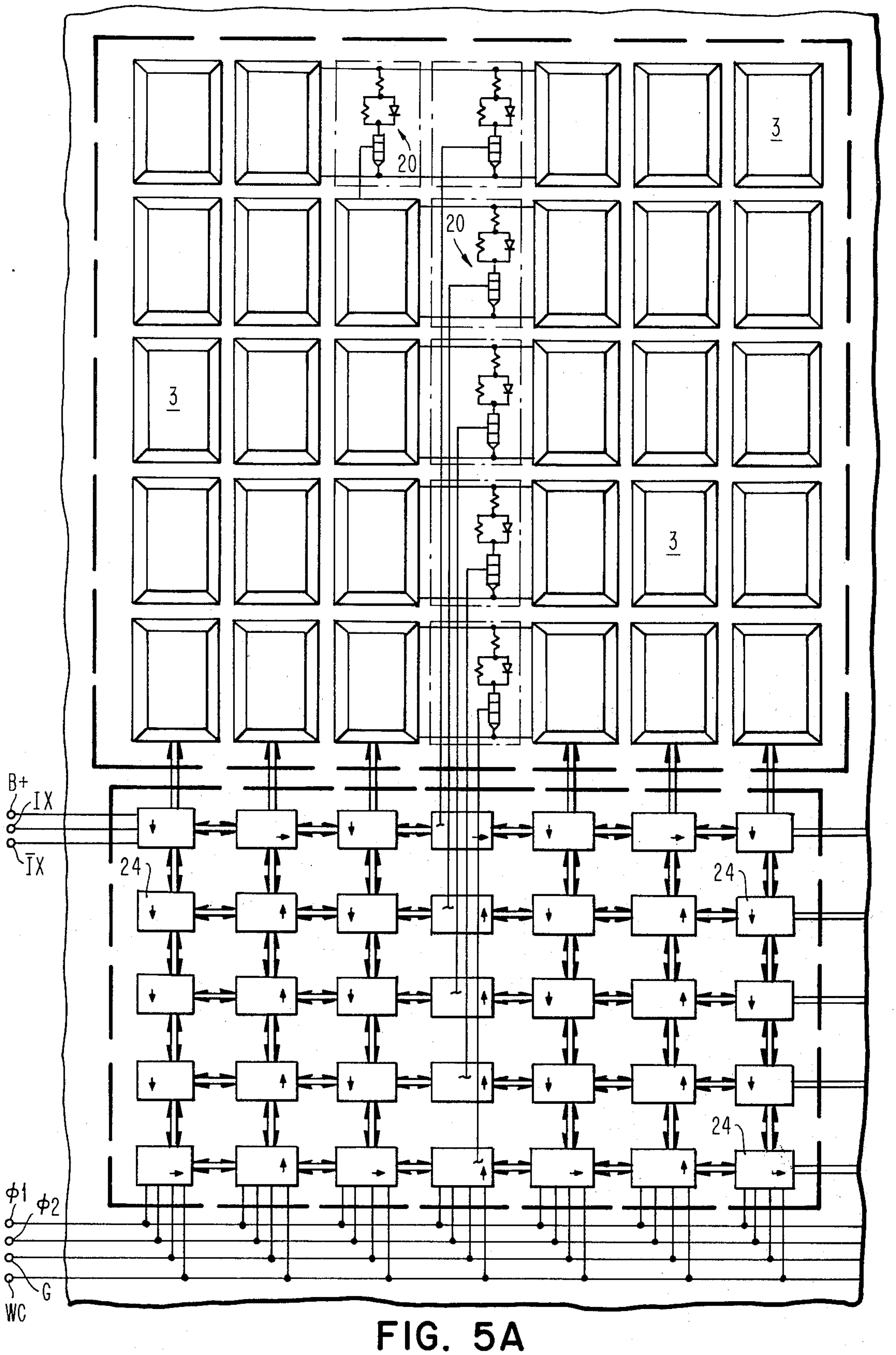
FIG. 5A is a schematic logic and circuit diagram illustrating the disposition of a character generating matrix with associated drive and character generating circuitry.
Figure 6A:
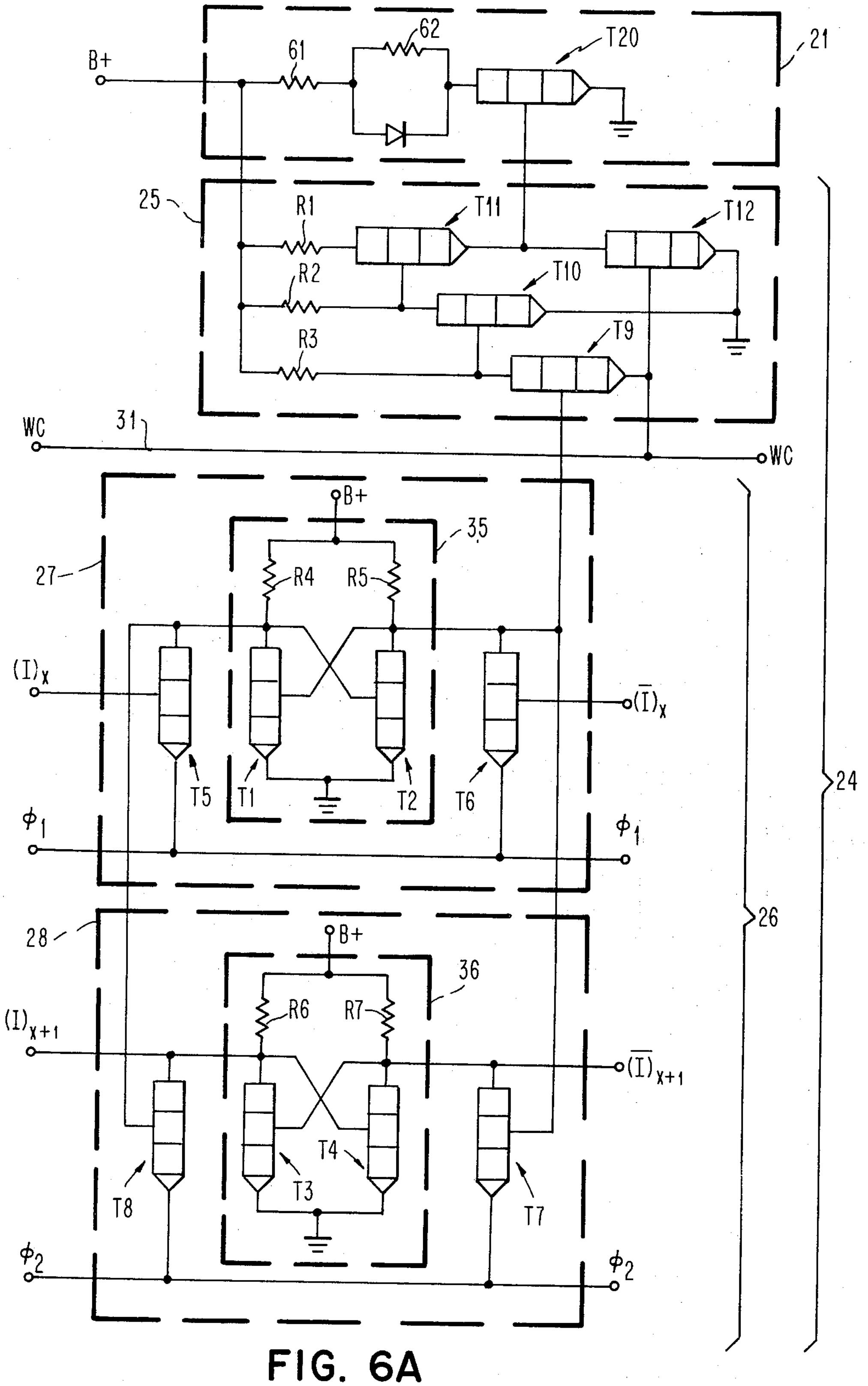
FIG. 6A–D are schematics of the equivalent electrical circuits employed in the thermal printing or display embodiments of this invention.
Figure 6B:
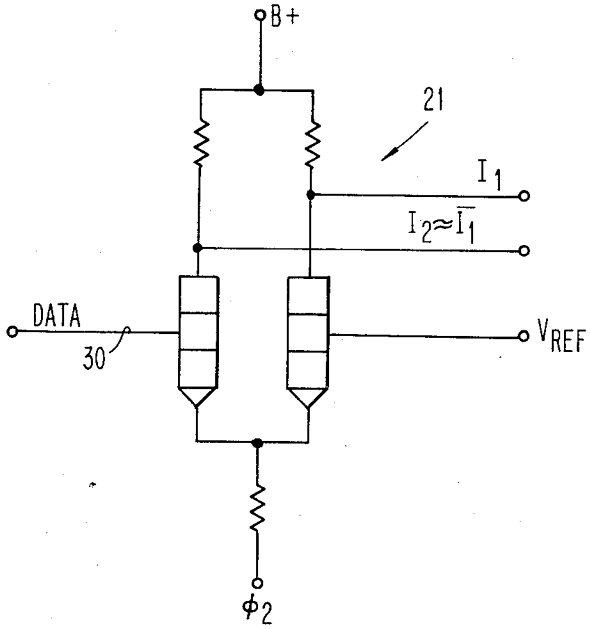
Figure 6C:
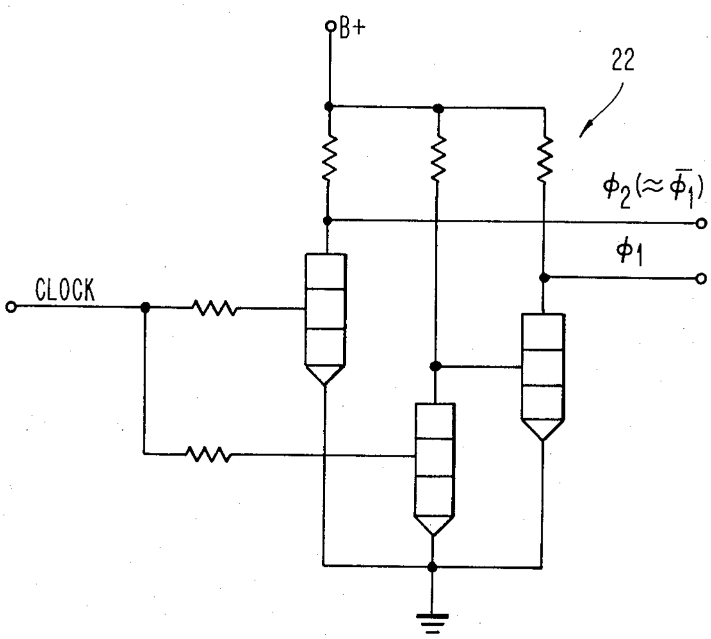
Figure 6D:
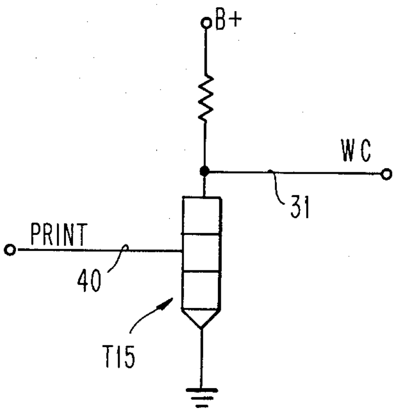

Related FIG. 6A also shows an equivalent circuit 20 of the heating circuit integrated within each semiconductor heating element 3. Associated with each heating element 3 is a data unit 24 which includes a driving circuit 25 and a data gate 26 of a two-phase shift register comprised of data cells 27 and 28. The relationship of a 5 × 7 array of heating elements 3 (comprising one character matrix) with their corresponding data units 24 is illustrated in FIG. 5A with a portion of the structure shown in unfolded linear form in FIG. 5B, wherein SR–(1), SR–(2) . . . SR–(N) are the data unit stages in association with respective ones of heating elements 3–(1) to 3–(N). As embodied in the equivalent circuits of FIGS. 6A to 6D, the serial data input on line 30, under command of control signals $\phi_1$ and $\phi_2$ (e.g. $\bar{\phi}_1$), will shift into and be stored in the data unit stages (SR–(1) to SR–(N), when the write control line 31 is up. After the shifting of data is completed, the drive circuit 25 will accept parallel data from the data gates when the potential on write control line 31 is lowered, whereby the addressed heating element will be turned on and the element will be heated. Once the printing cycle is complete, the potential on write control line 31 will be raised and all heating elements 3–(1) to 3–(N) will be turned off.

More specifically, each data unit stage 24 will include (as noted above), a drive circuit 25 (comprised of transistors T9, T10, T11 and T12) and a data gate 26 of a two-phase shift register formed of complementary data cells 27 and 28 (where data cell 27 is comprised of transistors T1, T2, T5 and T6, and with data cell 28 comprised of transistors T3, T4, T7 and T8).

Essentially, the basic data gate 26 of the two-phase shift register includes four coupling transistors (T5, T6, T7 and T8) and two memory cells 35 (which includes transistors T1 and T2) and 36 (which includes transistors T3 and T4) of the type disclosed in U.S. Pats. No. 3,508,209 and No. 3,601,669 whose teachings are incorporated herein by reference thereto, in illustration of the structure and the integrated circuit techniques of forming the structures as an integrated circuit in a semiconductor substrate, such as silicon.

Referring to FIG. 6A, the memory cell 35 is coupled to input lines $(I)_x$ and $(\overline{I})_x$ through transistors T5 and T6 and also coupled to memory cell 36 through transistors T7 and T8. The phase lines $\phi_1$ and $\phi_2$ (e.g. $\overline{\phi}_1$) which are complementary to each other, are used to decouple memory cell 35 from input lines $(I)_x$ and $(\overline{I})_x$ and also decouple memory cell 36 from memory cell 35. The output terminals $(I)_{x+1}$ and $(\overline{I})_{x+1}$ are used to transfer information stored in memory cell 36 to the memory cell 35B of the next data gate 26B.

In operation, when control lines $\phi_2$ is down, the control line $\phi_1$ will be up so that memory cell 35 will be decoupled from input lines $(I)_x$ and $(\overline{I})_x$ but coupled to memory cell 36. The information transferring to memory cell 35 during prior information transfer is not stored in memory cell 35 and since this cell is also coupled to memory cell 36, the same information is transferred to memory cell 36 for storage there.

When control line $\phi_1$ is down (with control line $\phi_2$ up), memory cell 35 will be coupled to the input lines $(I)_x$ and $(\overline{I})_x$ and decoupled from memory cell 36. At this point, information stored in memory cell 36A of a prior data gate 26A will be transferred to memory cell 35 of the data gate 26 in point. Concurrently, the information stored in memory cell 36 of the data gate 26 in point will be transferred to memory cell 35B of the shift register 26B in the next data unit 24B, with the acceptance and transfer made throughout the transfer sequence.

The driver circuit includes four transistors T9, T10, T11 and T12 with transistor T9 used mainly as a coupling transistor and transistor T10 employed to develop the necessary voltage charge level. Also transistor T11 is used to drive the base of the heating element transistor T20, whose collector leakage is drained by transistor T12 during the turnoff cycle.

When the information transfer cycle is complete, the shift register is in standby. When the write control line 31 is drawn down, information at the collector of transistor T6 of the data cell 27 will actuate transistor T9 of drive circuit 25, which in turn will actuate transistor T11 to drive the base of the heating element transistor T20. In the meantime, transistor T12 will be turned off.

When the write cycle is complete, the write control line 31 will be up, and the transistor T9 will decouple the shift register from the driving circuits. Concurrently, transistor T12 will be on so that the leakage current from the heater transistor T20 will be drained so as to turn the activated heating element off. During the operation, the voltage level of write control line 31 will be prescribed by means of the print control circuit 23 of FIG. 6D, in response to the print signal at input 40.

Figure 7A:
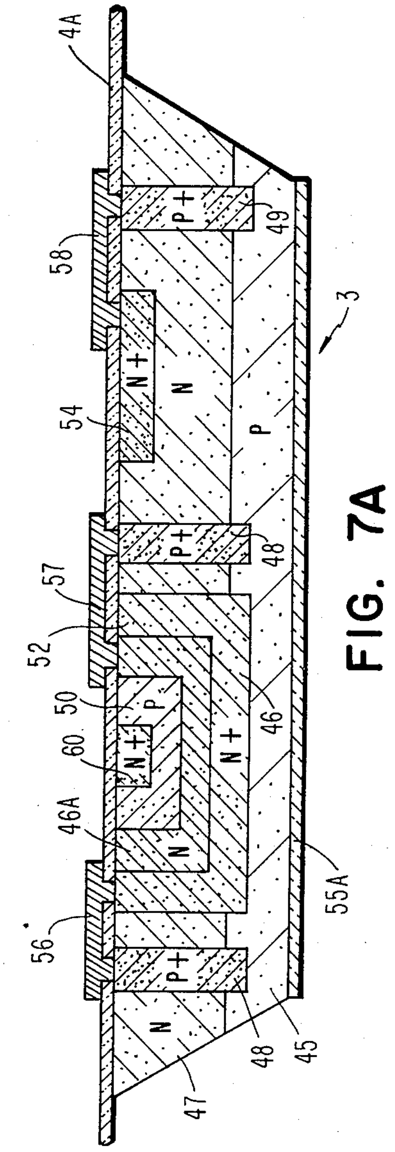
FIG. 7A illustrates a thermal heating element from the structure of FIG. 7.
Figure 7:
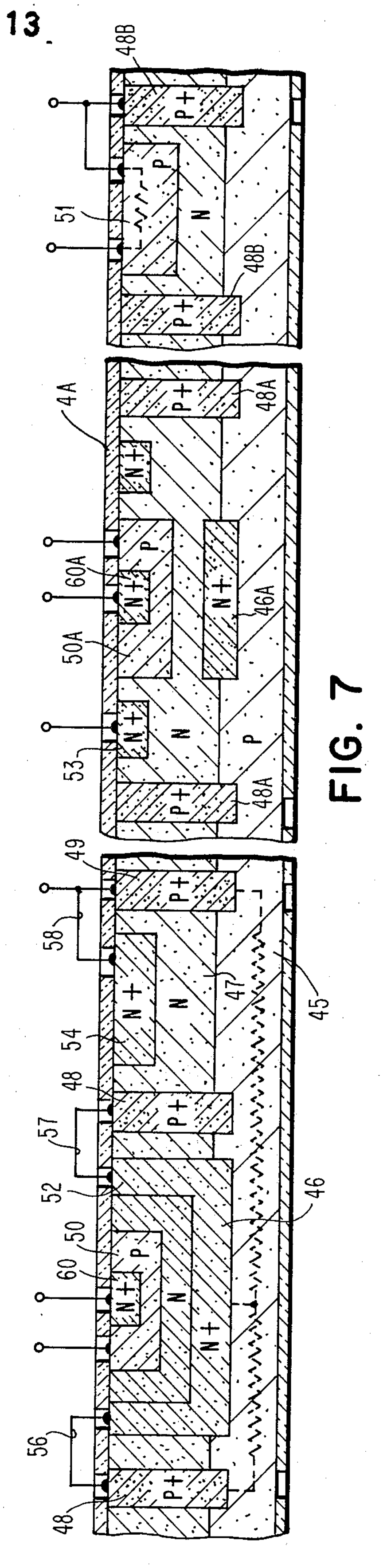
FIG. 7 illustrates an intermediate semiconductor structure formed in fabrication of the thermal display unit.
Figure 7B:
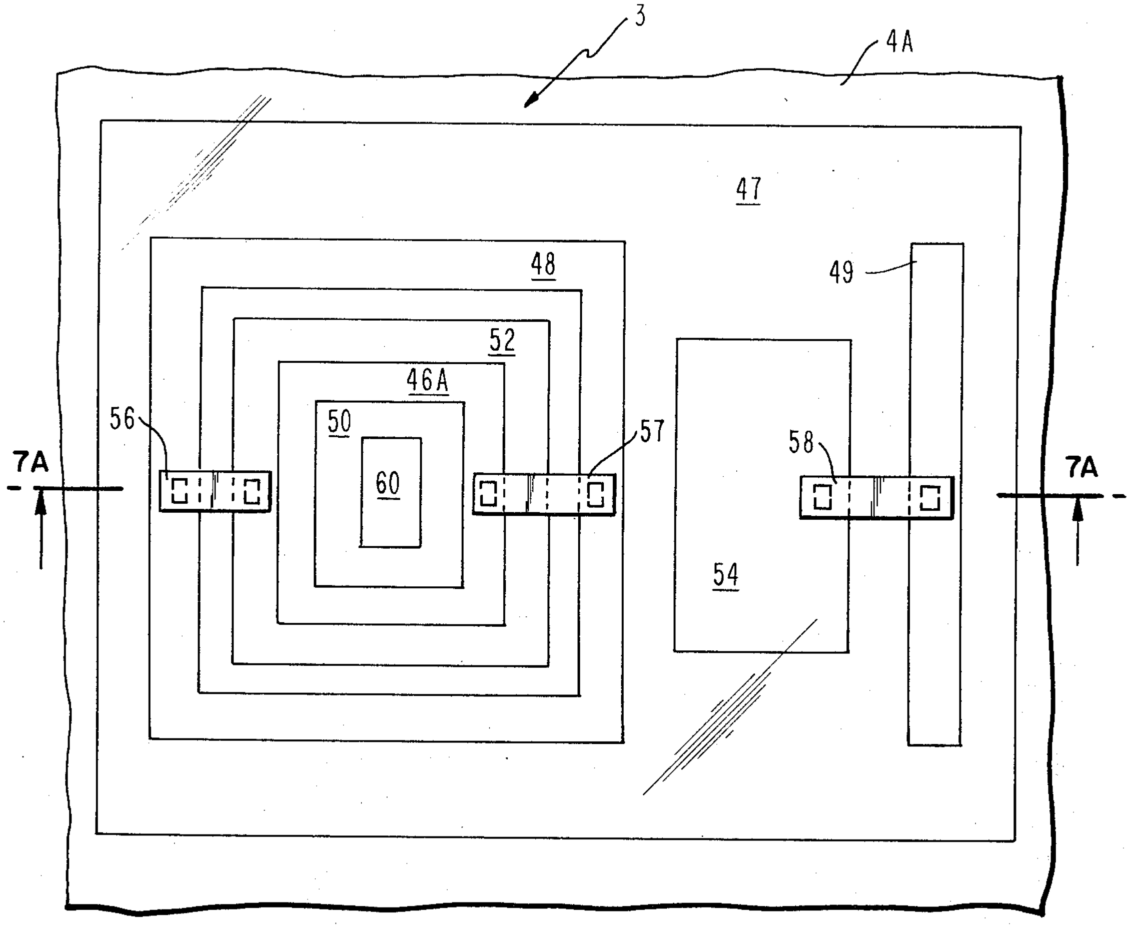
FIG. 7B is a plan view of the heating element of FIG. 7A.

The specific structural configuration of the novel semiconductor heating element of this invention is illustrated in FIGS. 7 and 7B and which is comprehended as being concurrently fabricated with the passive and active components of the supporting circuitry (e.g. shift register, drive circuits, complementary generators, etc.) as illustrated in intermediate structure of FIG. 7A for the fabrication of the final thermal display. Such a structure, as fabricated in accordance with the teachings of the aforesaid U.S. Pats., No. 3,508,209 and No. 3,601,669, comprises in the initial fabrication a substrate 45 of a semiconductor material, e.g. silicon of a particular first conductivity type, such as the P type illustrated and preferably having a resisitivity of about 0.5 to about 1 ohms centimeter, or more. The substrate is of monocrystalline structure obtained by conventional techniques such as pulling a silicon semiconductor ingot from a melt containing the desired impurity concentration, e.g. boron and, after shaping of the pulled silicon ingot, slicing it into a plurality of wafers of about 150 to about 200 microns thick. The substrate 45 is a portion of such a wafer.

In the next operation not shown but obvious, a dielectric coating conveniently genetic or thermal silicon oxide is formed on a planar surface of substrate 45 and in which coating is formed a diffusion opening by conventional photolithographic masking and etching techniques, for purposes of forming the low resistivity subcollector regions 46 and 46A of a second opposite type conductivity, such as N+ type indicated in the drawings. These subcollector regions are developed by conventional selective diffusion to a surface concentration of about $10^{20}$ to about $5 \times 10^{20}$ atoms/cc, or more, utilizing dopants such as arsenic, phosphorous, and the like. After removal of the diffusion mask, a high resistivity layer 47 of N type conductivity is epitaxially grown on the substrate 45 to a thickness of about 2 to about 5 microns with a resistivity of about 1 to about 3 ohms centimeters.

The active and passive components of the thermal display are formed in the epitaxial layer 47 by well-known diffusion techniques, which include forming an oxide coating, use of photoresist masking operations for selective removal of the oxide (e.g., by etching), diffusion of an impurity, reoxidation, metal plating and its subsequent photolithographic delineation into a conductor pattern, with repetition of one or more of the steps as necessary to obtain the required integrated circuit configuration, and the required levels of interconnections for the components.

The use of these conventional techniques in conjunction with the teachings of the aforesaid U.S. Pats. No. 3,508,209 and No. 3,601,669 is employed to obtain the structure shown in FIGS. 7, 7A and 7B. Such operations include the use of an acceptor doping impurity, such as boron deposited in a pattern for defining a low resistivity P+ type diffused isolation regions 48, 48A and 48B typically having a surface concentration from about $10^{20}$ atoms/cc, which extend, after a drive-in step, downwardly through the N type epitaxial layer 47 from the top surface thereof to and into the P type substrate 45. These P+ isolation regions 48, 48A and 48B circumscribe regions of the N type layer in which various passive and active components are formed. Concurrently, the diffusion of acceptor, impurities, e.g. boron, will also be employed to form, after a drive-in step, a low resistivity P+ reach-through or access region 49 through the N type epitaxial layer 47 to the substrate 45 for purposes of providing access thereto for electrical connection.

A second quantity of like dopant source, e.g. boron, is deposited within the functional regions, circumscribed by corresponding isolation regions 48, 48A and 48B, for forming the base regions 50 and 50A, and the resistor region 51. Generally, the surface concentration of the base regions 50 and 50A and that of the resistor region 51 may be from about $10^{19}$ atoms/cc, or more.

In the next operation, a quantity of donor impurity, e.g., arsenic or phosphorous is diffused in a pattern within the functional regions to form, after drive-in, a low resistivity N+ collector wall or reach-through region 52 extending to the subcollector region 46. Normally, the surface concentration of the collector wall region 52 will be from about $9 \times 10^{20}$ atoms/cc. The same type conductivity determining impurity is also employed to form the low resistivity contact regions 53, the emitter regions 60 and 60A and the clamp-down region 54. These depositions may be at surface concentrations from about $5 \times 10^{20}$ atoms/cc.

The resultant structure is shown in FIGS. 7A and 7B after applicable heating operations for redistribution of dopant impurities deposited, and including the formation, by thermal or pyrolytic techniques, of an oxide layer 55 on the bottom surface of the P type semiconductor substrate 45 and reoxidation of the oxide layer on the top surface of the epitaxial layer 47.

Also shown in FIGS. 7 and 7A are tentative wire connections 56, 57 and 58 for purposes of correlating the integrated components in a heating element 3 with its equivalent circuit in FIG. 6A. In comparison, the original semicondcutor substrate 45 (of FIGS. 7 and 7A) forms the resistor 61 in the element 3 of FIG. 6A, whereas the combined resistance of isolation region 48 (FIGS. 7 and 7A) forms the resistance 62 of FIG. 6A, while the PN junction formed by substrate 45 and subcollector region 46 (FIGS. 7 and 7A) constitutes the diode 63 in FIG. 6A, wherein substrate 45 comprises the anode of diode 63 and the subcollector region 46 comprises the cathode of diode 63.

Figure 8:
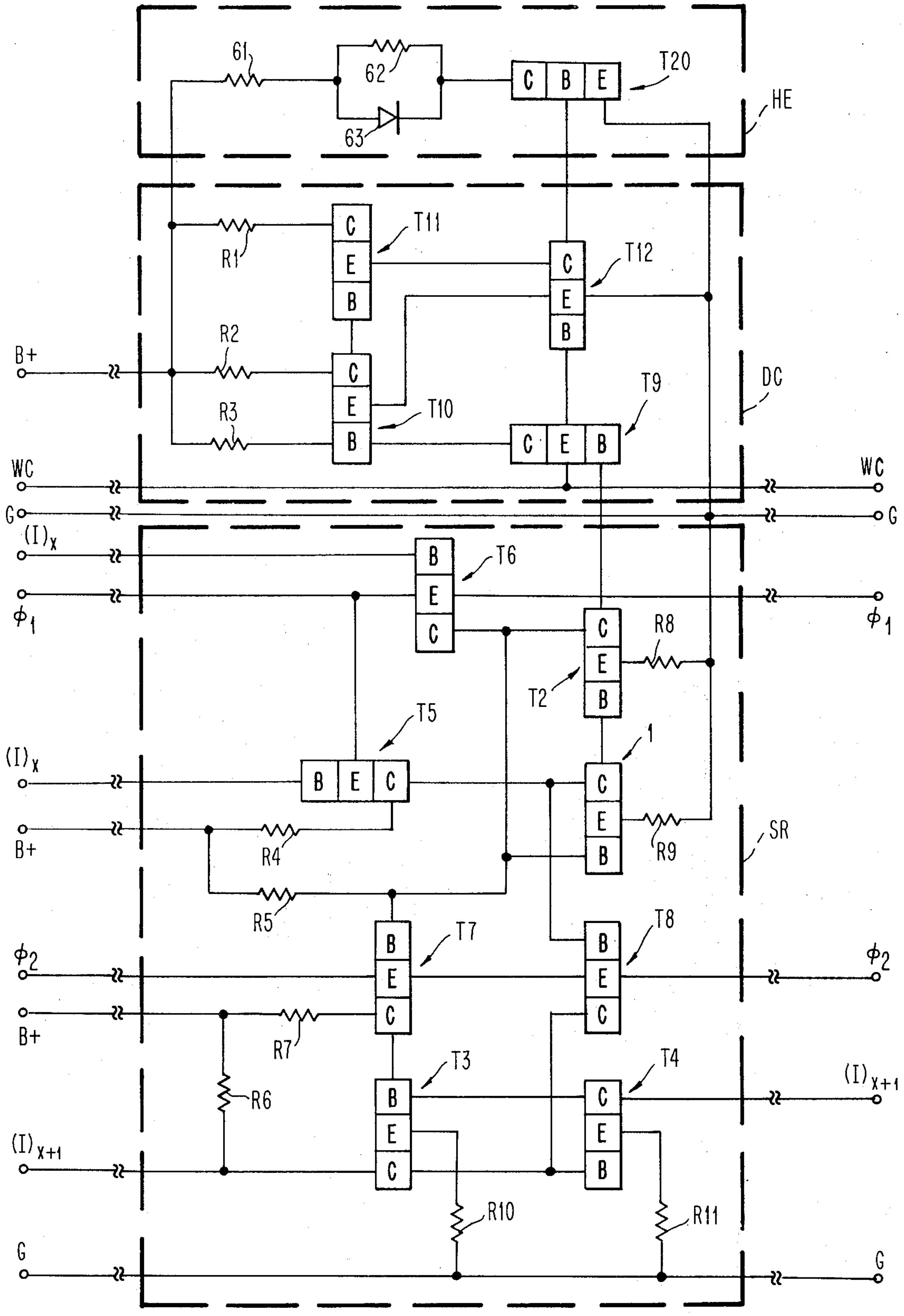
FIG. 8 illustrates the disposition of active or passive components in complementary portions of a thermal display combined with an illustrative heating element and is associated with portions of a character generator and drive circuitry.

The illustrated structure of FIGS. 7 and 7A also includes a final contact and passivation mask 4A, suitably silicon dioxide, formed during fabrication of the device on which a conductor pattern can be formed for interconnection of the functional components of the device (including connections 56, 57 and 58) so as to adapt it for external connection, as illustrated in the drawing of FIG. 8 which shows the relative disposition of the components and their access points in the thermal display.

Figure 9A:
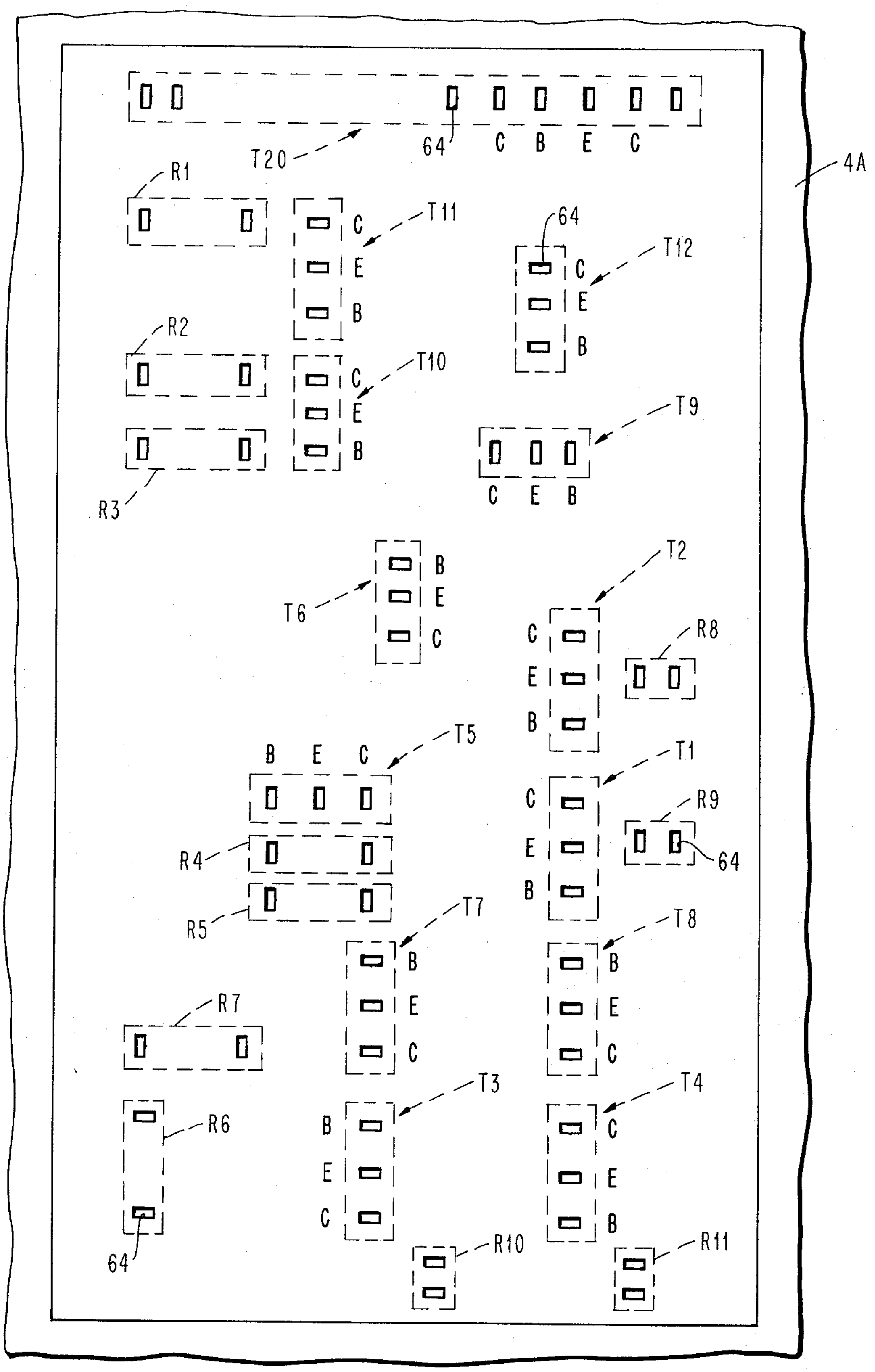
FIGS. 9A–9D illustrate various stages in the fabrication of various levels of metallization patterns for interconnecting the various components of FIG. 8.
Figure 9B:
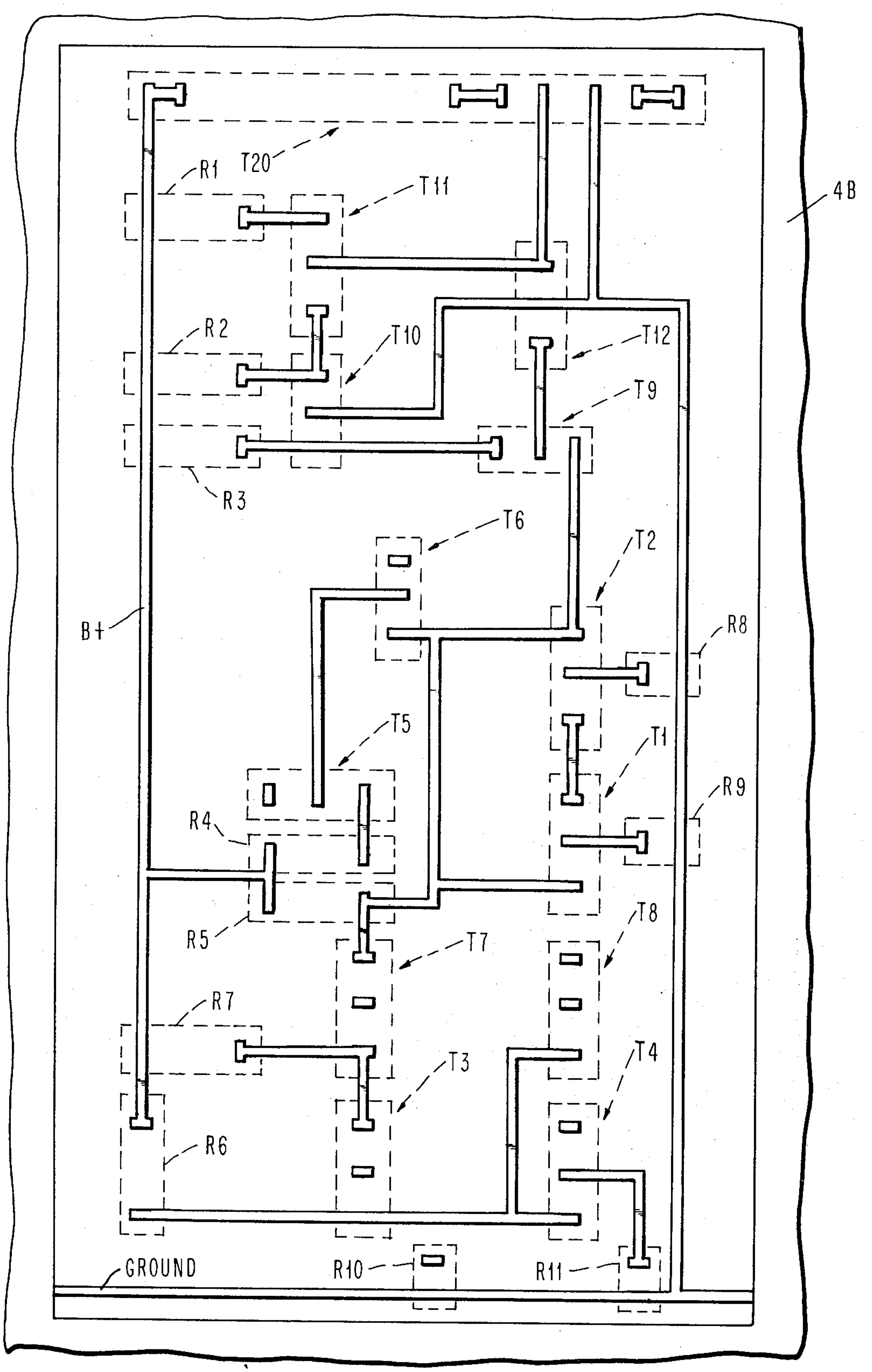
Figure 9C:
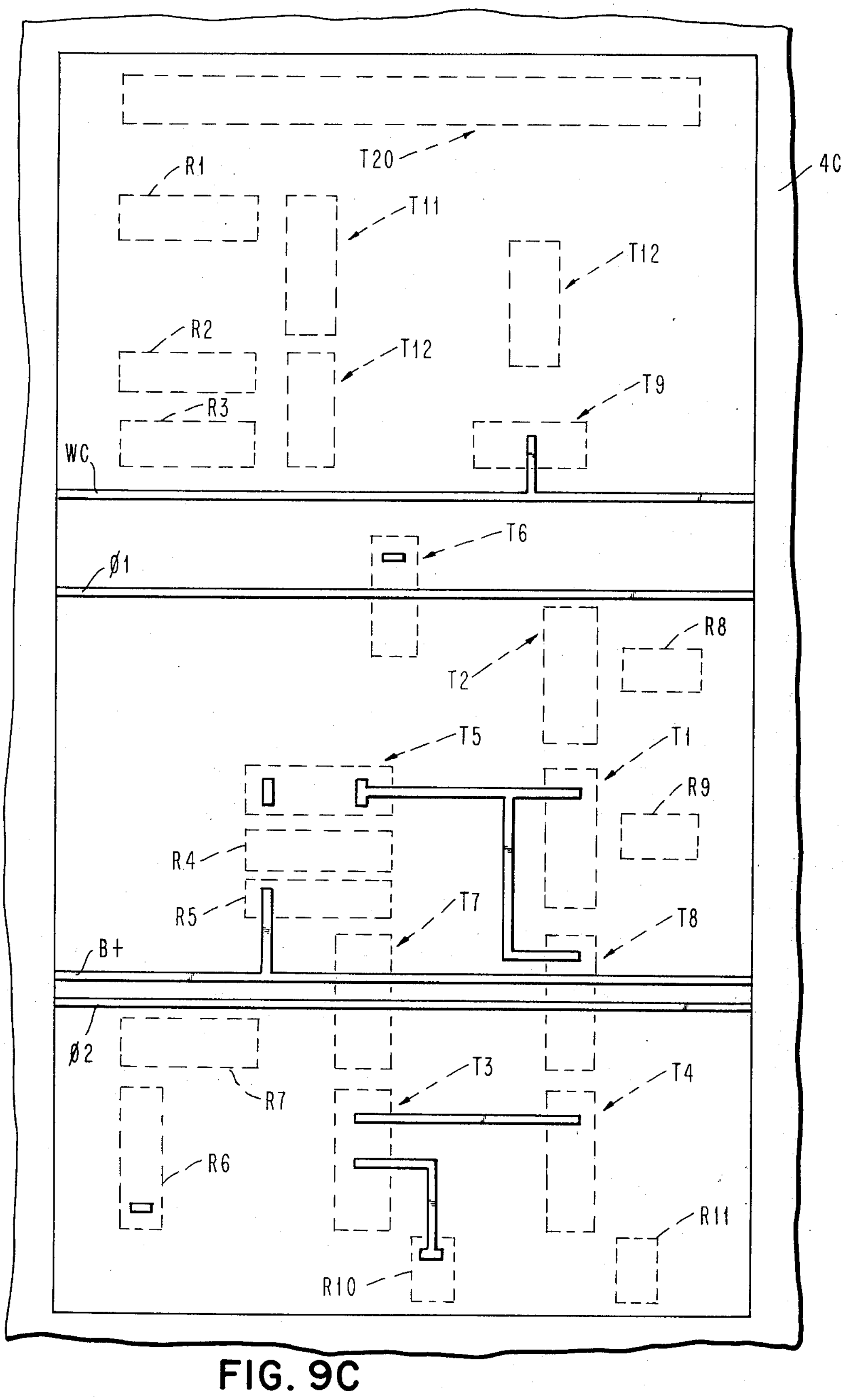
Figure 9D:
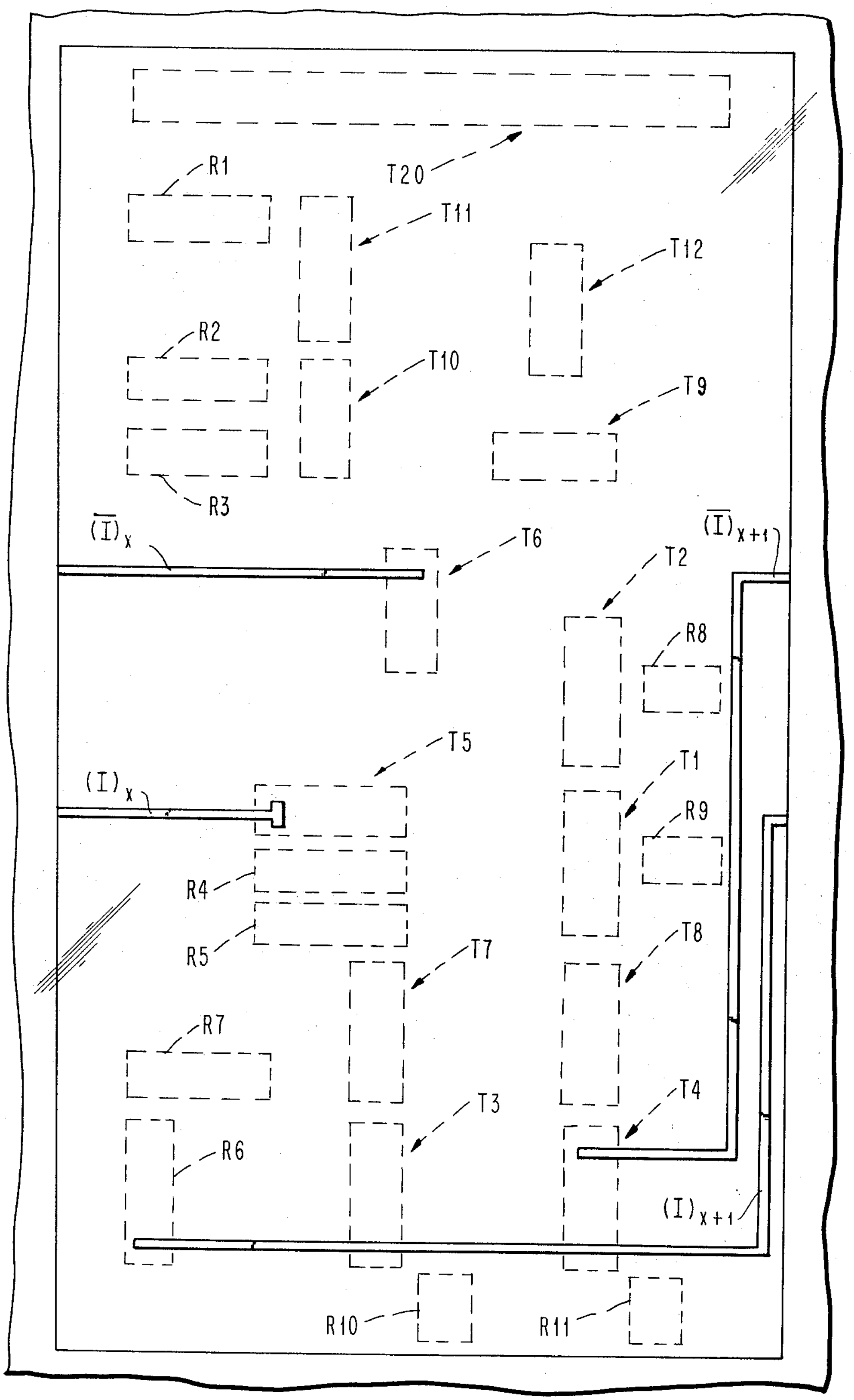

FIG. 9A depicts a structure analagous to that of FIG. 8 with the exception of illustrating the disposition of contact openings 64 formed in the silicon dioxide layer 4A for contact access of a first level conductor pattern formed by standard photolithographic techniques. The first level conductor pattern is illustrated in FIG. 9B over which is subsequently deposited another dielectric insulating layer 4B, such as quartz, deposited by a standard R.F. sputtering technique through which layer 4B is formed another set of contact openings by photolithographic techniques. These contact openings serve as a means of interconnecting the first level metallurgy of FIG. 9B with a second level conductor pattern coated on the insulating layer 4B and illustrated in FIG. 9C, following which an additional insulating layer 4C (e.g. sputtered quartz) is formed over the second level metallurgy, portions of which are accessed by corresponding contact openings formed in the insulating layer 4C, followed by deposition of the third level conductor pattern as shown in FIG. 9D. On completion of the necessary levels of interconnections (e.g., FIGS. 9B, 9C and 9D) a final protective layer is deposited over the entire surface through which contact holes or openings are provided for deposition of external contact pads 9 and support pads 9A, for access by contact pads 9 to the device metallurgy and for electrical connection to the conductor pattern 10 coated on the external support 11, see FIGS. 1 and 2. The support pads 9A are employed for leveling of the thermal printing device when mounted to the external support 11.

For purposes of delineating the heating elements 3 and the portion of the supporting circuitry, the back side of the unit, e.g. bottom face of substrate 45 is provided with a dielectric insulating layer 55, preferably and conveniently silicon dioxide, which is masked by photolithographic techniques to form a pattern of openings 55B defining the various portions of the thermal display. Thereafter, the semiconductor substrate 45 and the epitaxial layer 47 are etched through to the passivating or masking oxide layer 4A of the dielectric support 4, with a resulting illustrative heating element shown in FIG. 7.

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. A thermal printing device comprising:

A. a dielectric substrate;

B. a plurality of spaced semiconductor heating elements disposed in a matrix having common coplanar faces bonded to a surface of said substrate in electrical and thermal isolation from each other, with the heating elements in said matrix arranged in an array to produce selective patterns on a heat sensitive paper, with each said element comprising, C. a monocrystalline silicon body having said common face bonded to said substrate surface and including D. a high resistivity first layer of one conductivity type adjacent said common face, E. a high resisitivity layer of an opposite type conductivity forming a PN junction with a surface of said first layer and defining an opposite face of said body adapted for contact with heat sensitive paper, F. a low resistivity annular isolation region of said one conductivity type extending through said first layer from said common face thereof to said second layer and circumscribing a portion of said first layer, G. a low resistivity reach-through regions of said one type conductivity extending through a second portion of said first layer from the said common face thereof to said second layer in spaced and external relation to said isolation region, and H. biasing means in said first layer with said circumscribed portion thereof to constrain lateral conduction within said second layer.

2. The thermal printing device of claim 1 wherein the ratio of the resistivity of said second layer to said first layer is from about 1 to about 6.

3. The thermal printing device of claim 1 wherein the ratio of the thicknesses of said first layer to said second layer is from about 30 to about 100.

4. The thermal printing device of claim 1 wherein one of said layers is an epitaxial continuation of the other of said layers.

5. The terminal printing device of claim 1 wherein said biasing means includes a base region of said first conductivity type embedded in said first layer portion adjacent said one face within and in spaced relationship to said annular region, a low resistivity emitter region of said second conductivity type embedded within said base region adjacent said one face, and wherein said conductor pattern comprises only contacts on the opposite surface of said substrate and extending therethrough, respectively, to said emitter and base region and said reach-through region.

6. The thermal printing device of claim 5 including a low resistivity bias clamping region of said second type conductivity embedded in said first layer adjacent said one face between and in spaced relationship to said annular and reach-through regions, and conductive means on said opposite surface of said substrate electrically interconnecting said bias clamping and reach-through regions.

7. The thermal printing device of claim 6 including a low resistivity buried subcollector of said second conductivity type at the interface of said first and second layers, and disposed within and in spaced relationship to said annular region.

8. The thermal printing device of claim 7 including a second low resistivity reach-through region of said second conductivity type extending through said first layer portion from the said first face to said subcollector region, and within and in spaced relationship to said annular region, and conductive means on the said opposite surface of said substrate electrically interconnecting said annular region and said second reach-through region.

9. The thermal printing device of claim 1 including an integrated semiconductor circuit on the first said surface of said substrate in spaced electrical isolation to said heating elements, and comprising like first and second layers having a plurality of circuit elements for selectively activating said heating element; conductive means on said opposite surface of said substrate electrically interconnecting said circuit means to said biasing means of said heating elements, and means connected to said circuit means for selectively energizing said heating elements.

10. The thermal printing device of claim 9 wherein said circuit means comprises a memory means, and means for addressing said memory means.

11. The thermal printing device of claim 10 wherein said circuit means comprises a memory means for receiving serial data and converting it to parallel data at a plurality of parallel outputs; conductive means on said opposite surface of said substrate connecting said parallel outputs to respective ones of the said biasing means of said heating elements for selective actuation thereof in accordance with the data at said parallel outputs.

12. The thermal printing device of claim 11 wherein said memory means comprises a shift register means for receiving and storing serial data for conversion to parallel data at said plurality of parallel output lines.

13. The thermal printing device of claim 12 wherein said circuit means includes a drive circuit interconnected between each associated said biasing means of said element and said parallel output line.

14. The thermal printing device of claim 13 including an insulating coating on the said opposite surface of said substrate to sandwich all conductive means therebetween, and a conductive contact means on said coating in selective connection to said conductive means for biasing said circuit means and accessing said shift register to input serial data thereto.

15. The thermal printing device of claim 14 including a second insulating substrate having mounted thereon said coated first substrate, and conductive means on said second substrate comprising contact portion means electrically connected to said contact means, and terminal portions for connection to an external biasing means and a data input means for said shift register.

16. A thermal printing device comprising:

A. a silicon oxide substrate;

B. a plurality of spaced semiconductor heating elements disposed in an information-defining matrix and having common coplanar faces bonded to a surface of said substrate in thermal and electrical isolation from each other, with each said element comprising C. a silicon body having a PN junction coextending with and spaced from a said coplanar face and the opposite face thereto subdividing said body into first and second layers of opposite conductivity types, D. circuit means in one of said layers adjacent said substrate for generating and constraining lateral conduction of current through the other of said layers with corresponding generation of heat therein; and E. means for biasing selected ones of said current means into said conduction in accordance with patterns corresponding to programmed forms of information representation.

* * * * *